United States Patent [19]

Majewicz

[11] 4,309,535
[45] Jan. 5, 1982

[54] METHOD OF IMPROVING DISPERSIBILITY OF ANIONIC CELLULOSE ETHERS

[75] Inventor: Thomas G. Majewicz, Chadds Ford, Pa.

[73] Assignee: Hercules Incorporated, Wilmington, Del.

[21] Appl. No.: 184,582

[22] Filed: Sep. 5, 1980

Related U.S. Application Data

[63] Continuation-in-part of Ser. No. 113,878, Jan. 21, 1980, abandoned.

[51] Int. Cl.$^3$ .............................................. C08G 18/32
[52] U.S. Cl. .................................. 536/85; 260/29.6 H; 260/29.6 PM; 525/2; 525/4; 525/5; 525/6; 536/87; 536/101; 536/114; 536/121
[58] Field of Search .................... 260/29.6 H, 29.6 N, 260/29.6 PM; 106/197 C, 170, 177, 194; 536/85, 87, 114, 101, 121; 525/2, 4, 6, 5

[56] References Cited

U.S. PATENT DOCUMENTS

| | | | |
|---|---|---|---|
| 2,768,143 | 10/1956 | Henry | 106/197 C |
| 3,251,814 | 5/1966 | Gentile | 260/29.6 H |
| 3,396,034 | 8/1968 | Blondheim et al. | 536/85 |
| 3,461,115 | 8/1969 | Schwarzer | 536/87 |
| 3,563,978 | 2/1971 | Ochs | 536/85 |
| 3,637,564 | 1/1972 | Economou | 260/29.6 H |
| 3,719,503 | 3/1973 | Podlas | 426/573 |
| 3,833,061 | 9/1974 | Gall | 166/294 |
| 3,969,280 | 7/1976 | Sayce et al. | 252/522 |
| 4,043,952 | 8/1977 | Ganslaw et al. | 536/114 |
| 4,153,592 | 5/1979 | Burroway et al. | 260/29.6 N |
| 4,209,434 | 6/1980 | Wilson et al. | 260/29.6 N |

Primary Examiner—A. Lionel Clingman
Attorney, Agent, or Firm—William S. Alexander

[57] ABSTRACT

Easily dispersible anionic water-soluble polymers are disclosed which are prepared by lightly treating particulate water-soluble polymer with a water-soluble aluminum salt and an aluminum chelant. Rate of hydration is retarded when the particles are added to aqueous media, allowing the particles to be dispersed completely before their surfaces hydrate sufficiently to gel and prevent complete dissolution.

4 Claims, No Drawings

METHOD OF IMPROVING DISPERSIBILITY OF ANIONIC CELLULOSE ETHERS

This application is a continuation-in-part of my co-pending U.S. patent application Ser. No. 113,878, filed Jan. 21, 1980 abandoned.

This invention relates to a method of improving the quality of solutions of anionic water-soluble polymers. Specifically, it relates to method of improving the clarity and smoothness of solutions prepared from such polymers which have been treated to improve dispersibility.

Water-soluble polymers are important items of commerce which find application in one way or other in virtually every type of commercial and industrial endeavor taking place in the world today. A variety of such products are known and each has its own particular applications where it is useful.

Many water-soluble polymers, however, exhibit one common problem which can be a nuisance to the user when it is desired to use them in water solution. They are poorly dispersible in water due to their great affinity for water. When such derivatives are added in particulate form to water, their surfaces immediately hydrate to such an extent that a gel forms about the surface and water is prevented from reaching the inner areas of the particle, thus drastically reducing the rate of solution formation. Moreover, the surfaces of these particles are now sticky and this causes the particles to agglomerate when they come into contact, thereby further reducing the dissolution rate. At this point the polymer can only be put into solution by subjecting it to very strenuous agitation for relatively long periods of time.

It has been proposed to improved dispersibility of particulate anionic water-soluble polymers by applying to the surface of such particles a sufficient amount of a polyvalent metal ion, particularly aluminum, to lightly crosslink the surface of the particles. When treated in this manner, the surface of a particle hydrates more slowly so that the particle disperses easily in water without agglomeration and lumping. This allows the entire particle of anionic cellulose derivative to be accessible to water and it can be easily dissolved without the use of powerful agitating equipment. See, e.g., U.S. Pat. No. 4,043,952 to Ganslaw et al. U.S. Pat. No. 3,637,564 to Economou, and U.S. Pat. No. 3,251,814 to Gentile.

For many purposes to which solutions of anionic water-soluble polymers are put, the product treated according to the cited art is quite suitable as it dissolves readily to form the required viscous solution. For some purposes, however, the solution is not of sufficiently good quality. The complexed or crosslinked anionic polymer on the surface of the particles is not readily soluble and, accordingly, contributes to the formation of haze in the solution. If the level of treatment is sufficiently high, the crosslinked surfaces can even cause insoluble gel particles to form, leading to lumpy or structured solutions.

In accordance with this invention, it has been found that smooth, gel-free, and clear solutions can be prepared from aluminum salt treated anionic water-soluble polymers by carrying out the dissolution thereof in the presence of a chelant for the polyvalent metal. At the pH level maintained by the anionic water-soluble polymers during dissolution, the chelant appears to sequester the aluminum and break down the crosslinks created by the aluminum on the water-soluble polymer surface, leading to complete dissolution of the anionic water-soluble polymer. The chelant does not, however, break down the crosslinks rapidly enough to interfere with the desired retardation of hydration.

The anionic water-soluble polymers to which the invention is applicable include polysaccharides such as xanthan gum, carageenan, algin or alginates, and pectin; modified polysaccharides such as carboxyalkylated cellulose derivatives, e.g., carboxymethyl cellulose, carboxyethyl cellulose, carboxymethyl hydroxyethyl cellulose or carboxymethyl hydroxypropyl cellulose, and anionic derivatives of starch; and polyacrylamide and copolymers of acrylamide with anionic comonomers such as acrylic acid and sodium acrylate. Some of these materials, such as the anionic celluloses, xanthan, and acrylamide polymers, exhibit greater lumping and gelling tendencies than do others and the invention is of greater significance to them. All can be helped by the invention, however.

Application of the aluminum to the surface of the anionic water-soluble polymer is effected through the use of a water-soluble aluminum salt. Aluminum chloride, aluminum nitrate, aluminum sulfate, sodium alum, aluminum acetate and aluminum lactate are exemplary. Generally speaking, the more water-soluble the salt and the higher the aqueous unbuffered pH of its solution, the better and more efficiently it performs. Thus, aluminum lactate and aluminum chloride are preferred salts for the purpose.

The anionic water-soluble polymers are preferably prepared by slurrying the particulate polymer in an aqueous organic diluent, in which it is essentially insoluble, containing a dissolved aluminum salt. The aqueous organic diluent is preferably an aqueous alcohol or ketone, in particular, methanol, isopropanol, butanol, acetone or methyl ethyl ketone, of about 30–40% water content. The aluminum salt can be added to the diluent either before or after the polymer is slurried therein. The concentration of aluminum salt must be sufficient to provide an aluminum-anionic substituent mole ratio of about 0.001 to 0.1. In general, higher molecular weight polymers require less aluminum salt than do these of lower molecular weight.

The surface-treated anionic polymer particles are recovered from the diluent by filtration and are washed with several volumes of aqueous diluent to remove residual aluminum salt. Final dry particle recovery is accomplished by dehydration from anhydrous diluent and drying in hot air.

The acidic nature of the aluminum salt treatment leaves the polymer in a slightly acid state, i.e., a water solution of such polymer will exhibit a pH of about 5.5 to 6.5. In most cases it is desirable to return the polymer solution to a more neutral or basic condition, i.e., water solution pH of about 6.5 to 8.0, in order to prevent auto-crosslinking of the anionic water-soluble polymer during subsequent handling, in particular during the recovery of dry particles from the aluminum treatment. Buffering to the appropriate pH can be accomplished via any basic reagent. The preferred buffering reagent is sodium bicarbonate.

The buffering reagent can be added directly to the slurry or it can be introduced during the washing or dehydration steps. The concentration to be used is, of course, dependent upon the concentration of aluminum salt used in the treatment. In general, 0.005 to 0.05 part of sodium bicarbonate is required per part of anionic water-soluble polymer.

Alternatively, the aluminum can be added to the polymer by spraying diluent wet particles with an aqueous solution of the aluminum salt. Excess aluminum salt is removed by washing and the treated polymer is dehydrated as described above with equivalent results.

The chelant can be dry blended with the treated polymer by conventional methods following the final drying and dehydration. Alternatively, the chelant can be present in the water in which the treated polymer is to be dissolved or it can be added to that water after the polymer has been dispersed therein. The preferred amount is between about 2 and 25% by weight based on the weight of polymer.

The concentration of chelant required is at least one mole of chelant per mole of aluminum. Increasing the concentration above the one-to-one ratio decreases the time required to reach optimum solution quality. The time can be controlled within a time period of several hours down to about several minutes.

Sodium hexametaphosphate is a good aluminum chelant. Other useful chelants include the following acids and their sodium, potassium, and other water-soluble salts: alpha-hydroxy mono- and di-carboxylic acids of 3 and 4 carbon atoms, such as malic, lactic, and tartaric acid; beta-hydroxy tricarboxylic acids such as citric acid; 2 to 4 carbon dicarboxylic acids such as oxalic, malonic, and maleic acid; versenic acid; and malic acid. The preferred chelant is sodium citrate or sodium hexametaphosphate.

When the aluminum chelant is a free organic acid of the type described above, the dispersibility and the solution rate of the treated polymer particles can be further improved by including some $NaHCO_3$ in the dry blend. The effervescence resulting from reaction of the bicarbonate and the acid causes increased agitation and comminution of the polymer particles, both of which favor dissolution of the polymer.

The invention is illustrated by the following examples. In the examples, dispersibility was determined by rapidly adding treated polymer to water agitated at 500 r.p.m. and noting the immediate effect of the water on the particles. Polymer concentration was 1% for high, 2% for medium, and 5% for low molecular weight material. Dispersibility ratings were as follows:

Poor—specimen clumped to form a large donut around the agitator blade
Fair—no donut but large lumps formed
Good—no large lumps but many small lumps formed
Excellent—very little or no lumping when specimen was introduced into water.

EXAMPLES 1 to 12

Dry, particulate carboxymethyl cellulose (10 parts) was slurried in about 55 parts of 90% aqueous isopropanol containing varying amounts of dissolved aluminum chloride. The slurry was agitated for two (2) hours at room temperature, then filtered to recover treated CMC particles. These were washed with fresh portions of the slurry diluent and then with anhydrous diluent to remove residual water. Finally, the treated mass was dried at 25° C. in air.

The utility of various chelants in improving the solution quality was demonstrated by preparing solutions of treated CMC and adding specified amounts of chelant to the solution immediately following the addition of CMC. Details and solution quality data are recorded in Table 1.

TABLE 1

| | CHELATING AGENTS[a] | | | | | | | |
|---|---|---|---|---|---|---|---|---|
| | CMC | | Aluminum in Product | Mol[c] | Chelating Agent | Solution Appearance[d] | | |
| Ex. | Mol Wt. | D.S. | Wt. % | Ratio | Concentration, %[b] | Clarity | Granularity | Qualtiy |
| Control | H | 0.7 | — | — | None | Cl | Low | Lumps |
| 1 | H | 0.7 | .15 | .012 | Sodium citrate . 2H$_2$O/5.0% | Cl | Low | Sm |
| 2 | H | 0.7 | .15 | .012 | None | H | High | St |
| 3 | H | 0.7 | .15 | .012 | Sodium hexametaphosphate 5.0% | Cl | Low | Sm |
| 4 | H | 0.7 | .15 | .012 | *EDTA-disodium salt . 2H$_2$O/5.0% | Cl | Low | Sm |
| 5 | H | 0.7 | .12 | .010 | Sodium citrate . 2H$_2$O/1.0% | H | High | Sm |
| 6 | H | 0.7 | .12 | .010 | Sodium citrate . 2H$_2$O/3.0% | Cl | Low | Sm |
| 7 | H | 0.7 | .12 | .010 | Sodium citrate . 2H$_2$O/5.0% | Cl | Low | Sm |
| Control | M | 0.9 | .1 | .009 | None | H | High | St |
| 8 | M | 0.9 | .1 | .009 | Sodium citrate . 2H$_2$O/5.0% | Cl | Low | Sm |
| Control | M | 0.7 | .3 | .024 | None | H | High | St |
| 9 | M | 0.7 | .3 | .024 | Sodium citrate . 2H$_2$O/5.0% | SH | Low | Sm |
| 10 | M | 0.7 | .3 | .024 | Sodium citrate . 2H$_2$O/10.0% | Cl | Low | Sm |
| Control | M | 1.2 | .3 | .029 | None | H | High | St |
| 11 | M | 1.2 | .3 | .029 | Sodium citrate . 2H$_2$O/5.0% | SH | Low | Sm |
| 12 | L | 0.7 | .5 | .040 | Sodium citrate . 2H$_2$O/20.0% | SH | Low | Sm |

[a]In Examples 5 to 7, the chelating agent was dry blended into the treated product.
[b]Weight percent based on polymer.
[c]Mole ratio of Al$^{+++}$ to carboxyl groups in the CMC.
[d]Solution appearance:
Clarity -
H = hazy
SH = slightly hazy
Cl = clear
Granularity - is a subjective measurement referring to concentration of gel specks
Quality -
Sm = smooth solution
St = structured solution
*EDTA = ethylendiamine tetraacetic acid (versenic acid)

EXAMPLES 13 to 16

The procedure described above was repeated with acrylamide—sodium acrylate copolymers of different anionic functionality levels using aluminum chloride as the surface treatment salt. The treated specimens were then dissolved in water to which was added 10% by weight (polymer weight) of sodium citrate dihydrate. Details are recorded in Table II.

TABLE II

| Ex. No. | Polymer | % Al in Polymer | Dispersibility | Added Sodium Citrate 2H₂O | Solution Appearance Turbidity | Quality |
|---|---|---|---|---|---|---|
| Control | A | 0 | Poor | 0 | Cl | Sm. |
| 13 | A | 0.09 | Excellent | 0 | H | St. |
| 14 | A | 0.09 | Excellent | 10.0 | Cl | Sm. |
| Control | B | 0 | Poor | 0 | Cl | Sm. |
| 15 | B | 0.12 | Excellent | 0 | H | St. |
| 16 | B | 0.12 | Excellent | 10.0 | Cl | Sm. |

EXAMPLES 17 to 20

Dry, particulate xanthan gum was treated with aluminum chloride as taught hereinabove. Solutions of this treated material were prepared in water and sodium citrate dihydrate. Details are recorded in Table III.

TABLE III

| Ex. No. | % Al in Polymer | Dispersibility | Added Sodium Citrate 2H₂O | Solution Appearance Turbidity | Quality |
|---|---|---|---|---|---|
| Control | 0 | Poor | 0 | H | Sm. |
| 17 | 0.15 | Fair | 10.0 | H | Sm. |
| 18 | 0.50 | Good | 0 | H | St. |

TABLE III-continued

| Ex. No. | % Al in Polymer | Dispersibility | Added Sodium Citrate 2H₂O | Solution Appearance Turbidity | Quality |
|---|---|---|---|---|---|
| 19 | 0.50 | Good | 10.0 | H | Sm. |
| 20 | 0.80 | Excellent | 20.0 | H | Sm. |

What I claim and desire to protect by Letters Patent is:

1. In the method of preparing aqueous solutions of anionic water-soluble polymers wherein particulate anionic water-soluble polymer is treated with aluminum ion to delay its hydration in aqueous systems, the improvement which comprises dissolving said treated polymer particles in the presence of about 2 to 25% by weight, based on polymer weight, of an aluminum chelant.

2. The method of claim 1 wherein the aluminum chelant is selected from the class consisting of sodium hexametaphosphate and sodium citrate.

3. The method according to claim 1 wherein the anionic water-soluble polymer is selected from the class consisting of carboxymethyl cellulose, xanthan gum, and acrylamidesodium acrylate copolymer.

4. In the method of preparing aqueous solutions of carboxymethyl cellulose wherein particulate carboxymethyl cellulose is treated with aluminum ion to delay its hydration in aqueous systems, the improvement which comprises dissolving said treated carboxymethyl cellulose in the presence of about 2 to 25% by weight, based on polymer weight, of an aluminum chelant selected from the class consisting of sodium hexamethylphosphate, sodium citrate, and the sodium salt of ethylenediamine tetraacetic acid.

* * * * *